United States Patent
Hu et al.

(10) Patent No.: US 11,693,942 B2
(45) Date of Patent: Jul. 4, 2023

(54) ACCESS CONTROL APPARATUS AND METHOD FOR CONTROLLING CONFIGURATION OF AUTOMATION APPARATUS

(71) Applicant: ABB Schweiz AG, Baden (CH)

(72) Inventors: Zhongliang Hu, Helsinki (FI); Mikko Kohvakka, Helsinki (FI); Janne Kallio, Helsinki (FI)

(73) Assignee: ABB Schweiz AG, Baden (CH)

( * ) Notice: Subject to any disclaimer, the term of this patent is extended or adjusted under 35 U.S.C. 154(b) by 371 days.

(21) Appl. No.: 16/864,219

(22) Filed: May 1, 2020

(65) Prior Publication Data

US 2020/0348653 A1 Nov. 5, 2020

(30) Foreign Application Priority Data

May 2, 2019 (EP) .................................... 19172167

(51) Int. Cl.
| | |
|---|---|
| *G06F 21/35* | (2013.01) |
| *G06F 8/65* | (2018.01) |
| *G06F 21/30* | (2013.01) |
| *H04L 9/32* | (2006.01) |
| *H04L 9/40* | (2022.01) |
| *G05B 19/418* | (2006.01) |

(52) U.S. Cl.
CPC ......... *G06F 21/35* (2013.01); *G05B 19/4183* (2013.01); *G05B 19/4185* (2013.01); *G05B 19/4188* (2013.01); *G05B 19/41865* (2013.01); *G05B 19/41885* (2013.01); *G06F 8/65* (2013.01); *G06F 21/305* (2013.01); *H04L 9/3234* (2013.01); *H04L 63/0853* (2013.01); *H04L 63/0892* (2013.01)

(58) Field of Classification Search
CPC .... G06Q 20/3229; G06Q 20/02; H04L 63/08; H04L 63/0853; H04L 63/20; H04L 9/083
See application file for complete search history.

(56) References Cited

U.S. PATENT DOCUMENTS

| | | | | |
|---|---|---|---|---|
| 10,219,154 | B1 * | 2/2019 | Hallock | H04L 63/083 |
| 10,491,604 | B2 * | 11/2019 | Gramelspacher | H04L 63/123 |
| 11,182,495 | B2 * | 11/2021 | Hegmann | G05B 19/00 |
| 2005/0097595 | A1 | 5/2005 | Lipsanen et al. | |
| 2010/0186075 | A1 * | 7/2010 | Hohlbaum | G06F 21/6218 |
| | | | | 713/168 |
| 2010/0269153 | A1 * | 10/2010 | Kato | H04L 9/3273 |
| | | | | 726/3 |
| 2014/0136419 | A1 * | 5/2014 | Kiyohara | G06Q 20/20 |
| | | | | 705/67 |

(Continued)

OTHER PUBLICATIONS

European Patent Office, Search Report issued in corresponding Application No. 19172167.9, dated Oct. 1, 2019, 3 pp.

*Primary Examiner* — Tae K Kim
(74) *Attorney, Agent, or Firm* — Leydig, Voit & Mayer, Ltd.

(57) ABSTRACT

An access control apparatus and method for controlling a configuration of an automation apparatus. The method includes: reading authentication information from an electronic tag; transmitting the authentication information to a networked service; receiving access rights from the networked service; and controlling the configuration of the automation apparatus according to the access rights.

18 Claims, 4 Drawing Sheets

(56) References Cited

U.S. PATENT DOCUMENTS

| | | | | |
|---|---|---|---|---|
| 2014/0179276 A1* | 6/2014 | Kang | ................... | H04W 76/14 |
| | | | | 455/39 |
| 2014/0337965 A1* | 11/2014 | Savini | ................ | H04L 63/0272 |
| | | | | 726/15 |
| 2015/0074749 A1* | 3/2015 | Vasko | ............... | G05B 19/4185 |
| | | | | 726/1 |
| 2016/0119284 A1* | 4/2016 | Kim | ....................... | H04L 67/12 |
| | | | | 726/12 |
| 2019/0215319 A1* | 7/2019 | Hu | ..................... | H04L 63/0807 |

\* cited by examiner

ACCESS CONTROL APPARATUS AND METHOD FOR CONTROLLING CONFIGURATION OF AUTOMATION APPARATUS

FIELD

Various example embodiments relate to an access control apparatus for controlling a configuration of an automation apparatus, and an access control method for controlling a configuration of an automation apparatus.

BACKGROUND

Automation apparatuses are used in process control and automation solutions of various industries. As sites may be large and/or distributed, configuration of automation apparatuses is a demanding task (in view of technical implementation, usability, data security, etc.). Further sophistication is clearly desirable.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Figure 1:
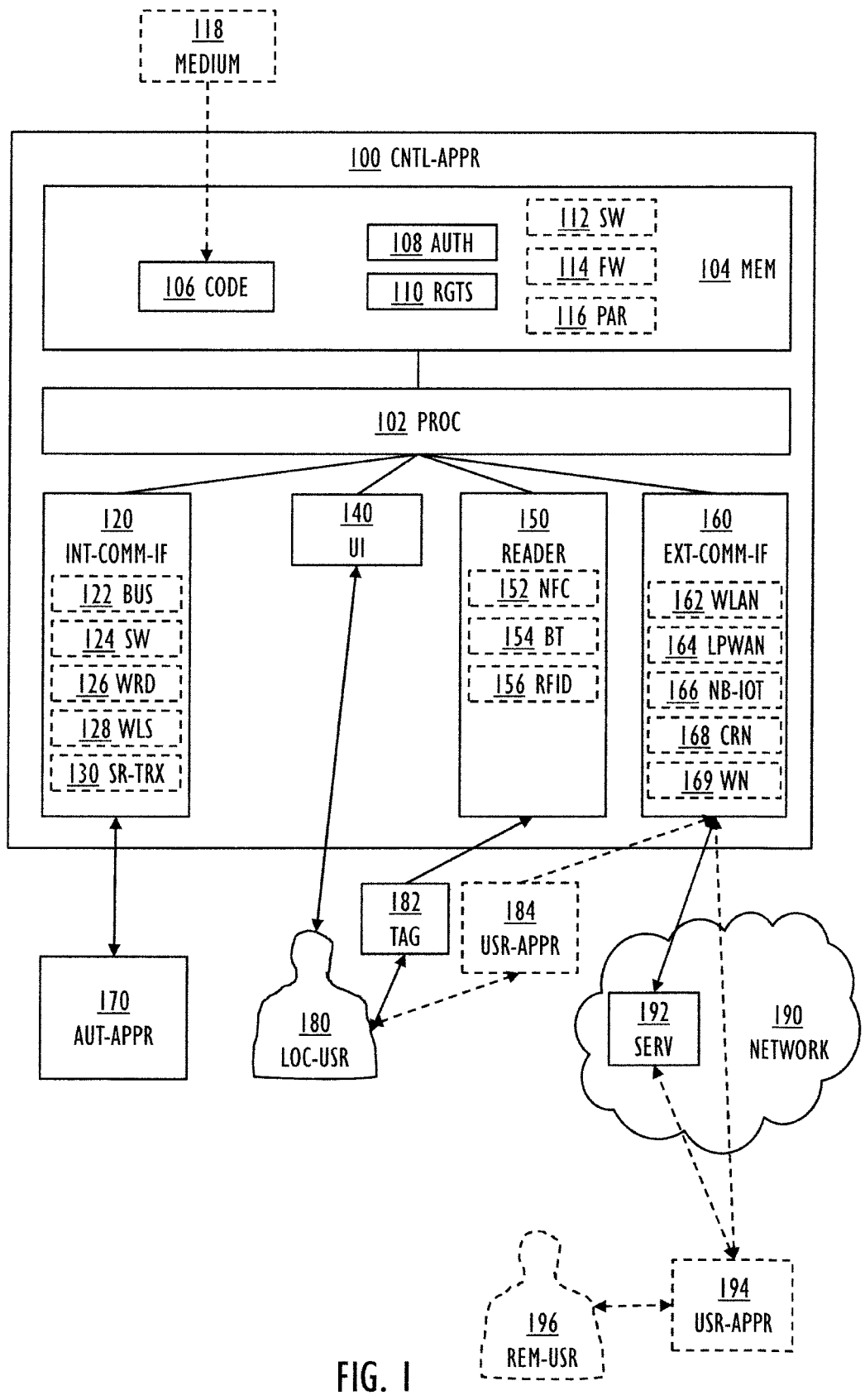
Figure 2:
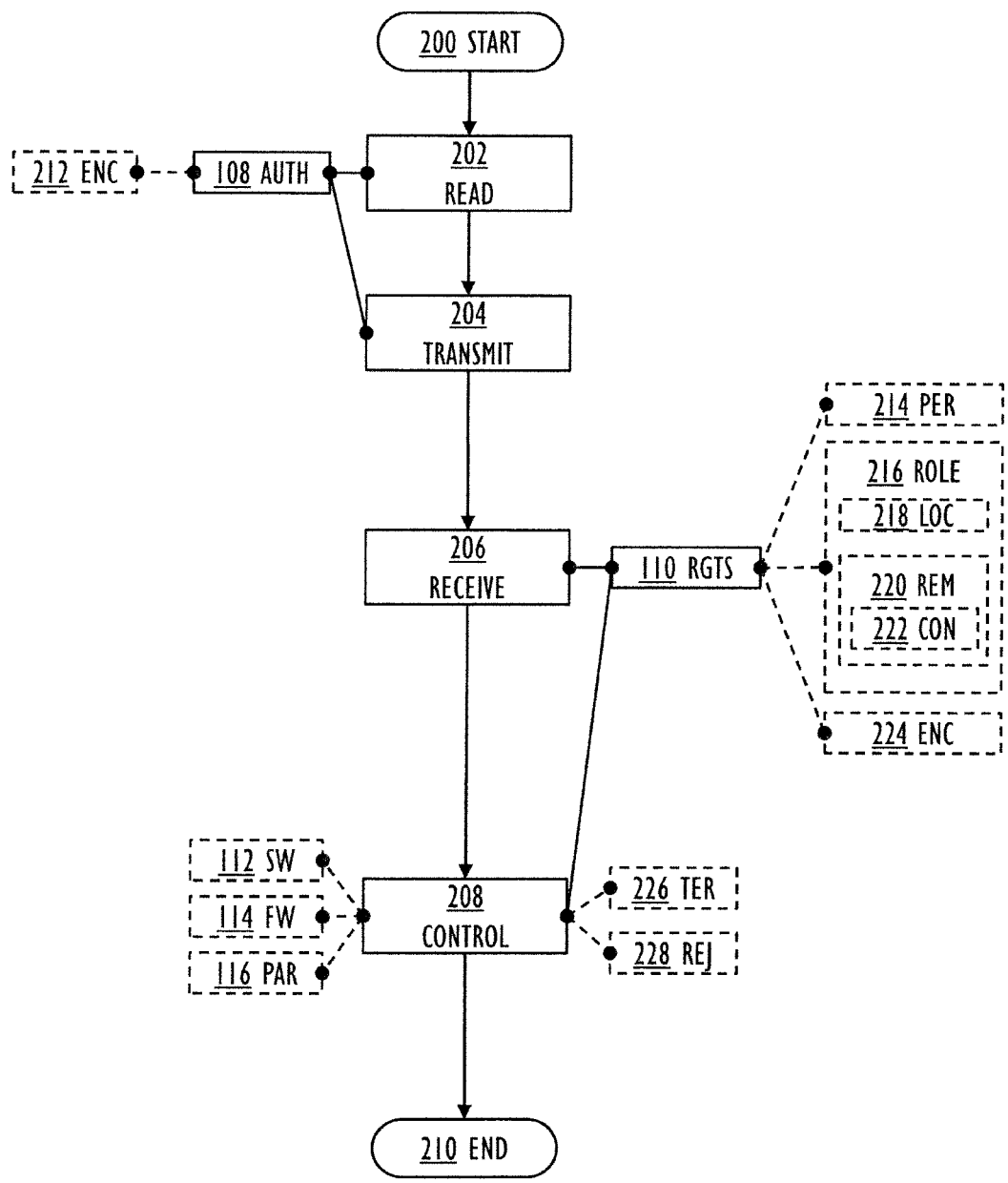
Figure 3:
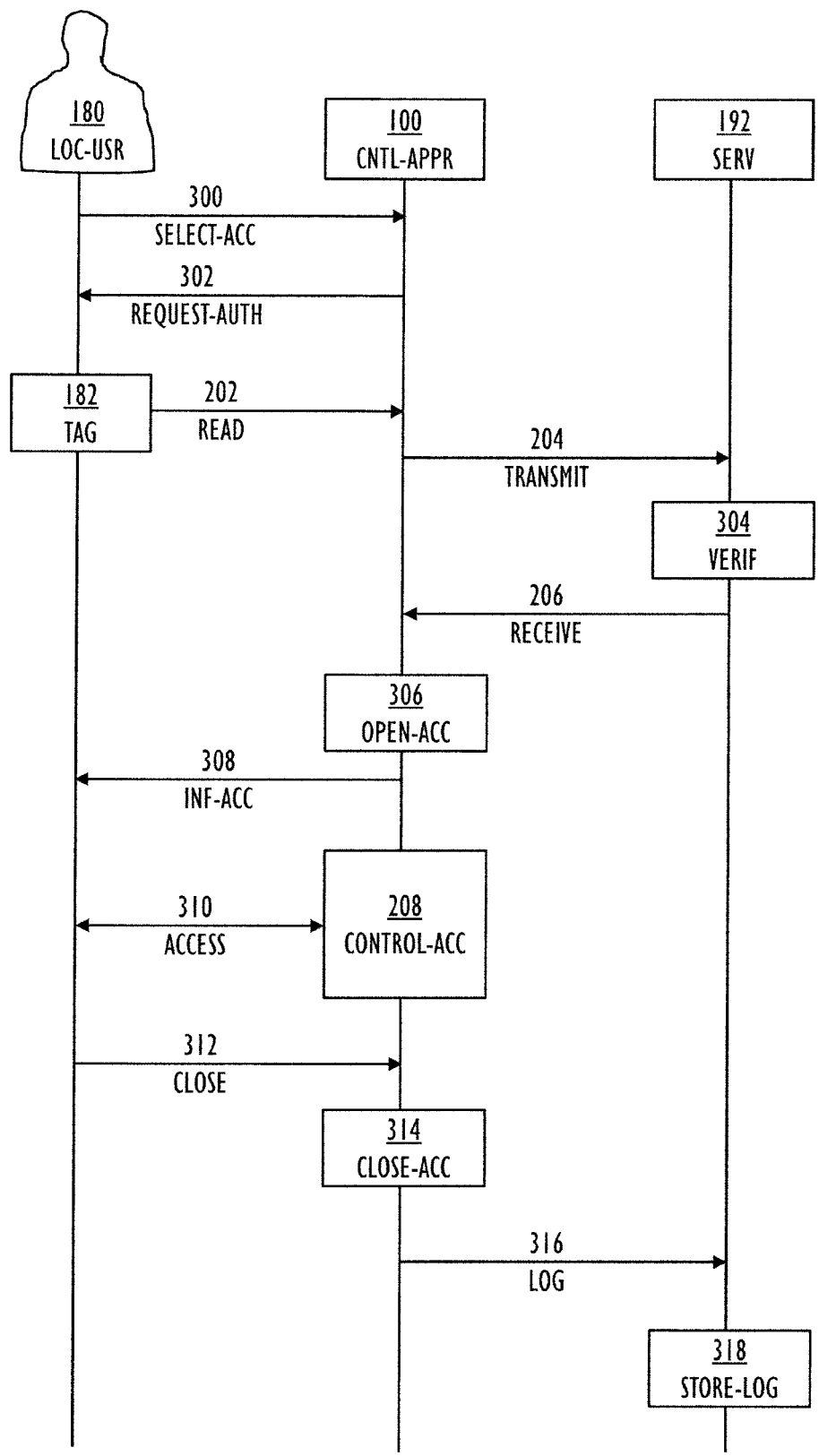
Figure 4:
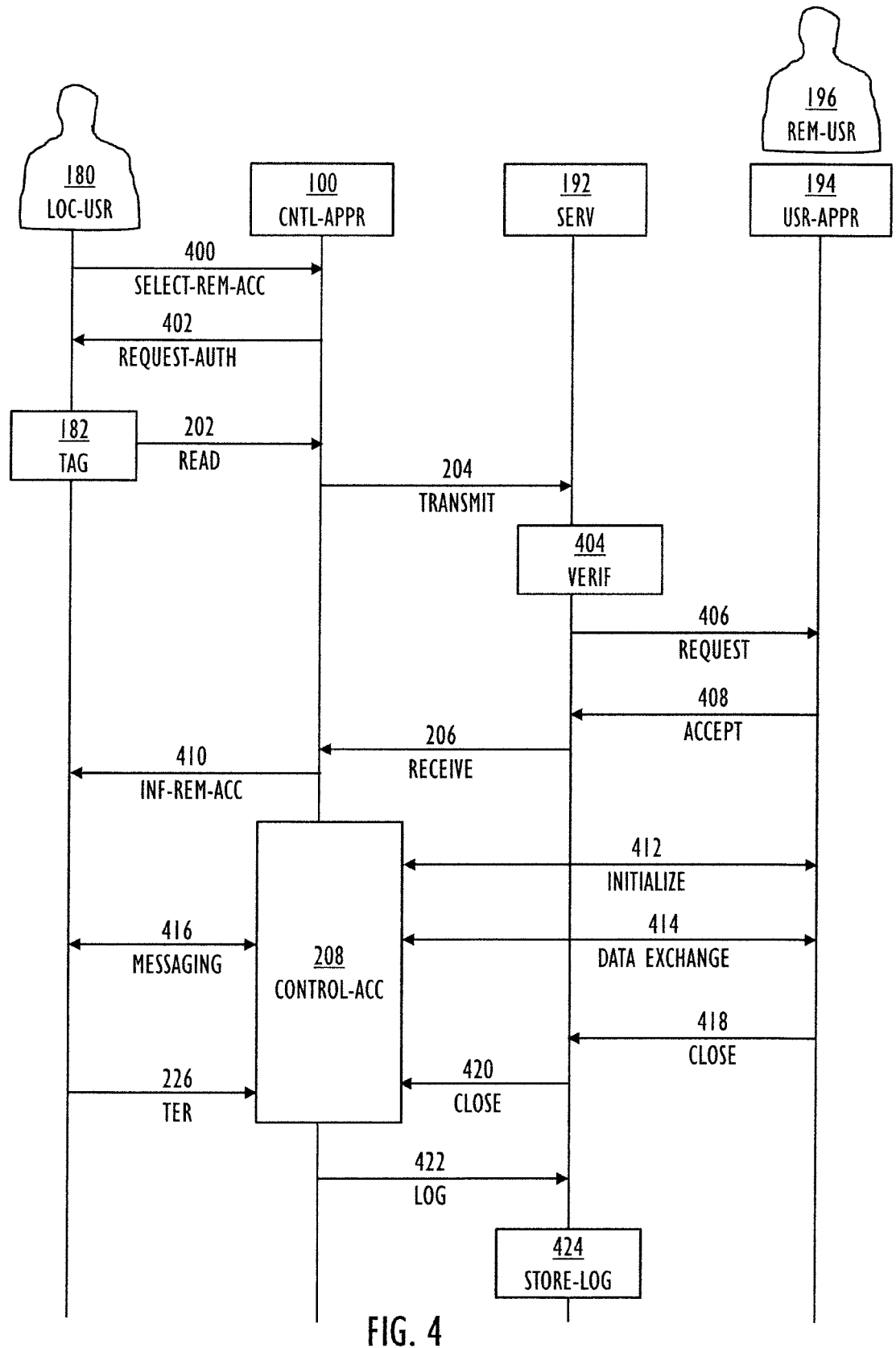

Some example embodiments will now be described with reference to the accompanying drawings, in which FIG. 1 is a block diagram illustrating example embodiments of an access control apparatus;

FIG. 2 is a flow-chart illustrating example embodiments of an access control method; and FIG. 3 and FIG. 4 are signal sequence charts illustrating example embodiments of the access control apparatus and the access control method.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

Let us study simultaneously both FIG. 1, which illustrates example embodiments of an access control apparatus 100 for controlling a configuration of an automation apparatus 170, and FIG. 2, which illustrates example embodiments of an access control method for controlling the configuration of the automation apparatus 170.

The automation apparatus 170 may be used in process control and automation solutions of numerous industries including, but not limited to: aluminium production, buiding and facilities, cement and glass, chemicals, data center automation, energy and utilities, food and beverage manufacturing, marine vessel management, metals processing, mining and minerals processing, oil, gas and petrochemical, original equipment manufacturers, pharmaceutical and life sciences, printing newspapers, ports, pulp and paper manufacturing, road and tunnel infrastructure, water and wastewater.

The access control apparatus 100 comprises a user interface 140 configured to interact with a local user 180. The user interface 140 is configured to implement exchange of graphical, textual and/or auditory information with the local user 180. The user interface 140 may be realized with various techniques, such as a display, touch pad, touchscreen, loudspeaker, keyboard/keypad/push buttons/rotary buttons, speech recognition system enabling audio control, cursor control device (mouse, track ball, arrow keys, touch sensitive area etc.), haptic feedback technology, etc. In an example embodiment, the user interface 140 is implemented with a separate panel such as an Internet of things (IoT) panel with an integrated NFC reader.

The local user 180 may be a local worker (such as a factory technician) working in an industrial site. There may also be a remote user 196 (such as a service engineer) working in a world-wide or market specific support center of the automation apparatus 170 provider/manufacturer.

The access control apparatus 100 comprises two communication interfaces: an internal communication interface 120 configured to communicate with the automation apparatus 170, and an external communication interface 160 configured to communicate with a network 190. The communication interfaces 120, 160 may operate with appropriate wired/wireless communication technologies and standard/proprietary protocols.

In an example embodiment, the internal communication interface 120 is configured to communicate with the automation apparatus 170 using one or more of the following: a bus interface 122 (such as an industrial communication bus), a software interface 124 (such as a method call, a message interface, an inter-process communication mechanism), a wired communication interface 126 (such as Ethernet), a wireless communication interface 128 (such as a wireless local area network interface), a short-range wireless transceiver 130 (such as Bluetooth).

In an example embodiment, the external communication interface 160 is configured to communicate with the network 190 using one or more of the following: a wireless local area network (WLAN) 162, a low power wide area network (LPWAN) 164, a narrowband Internet of things (NB-IoT) 166, a cellular radio network 168, a wired network 169 (such as Ethernet).

The access control apparatus 100 comprises a reader 150 configured to read an electronic tag 182. In an example embodiment, the reader 150 is passive, i.e., the reader 150 only receives radio signals from an active electronic tag 182, which has an own power source. In an alternative example embodiment, the reader 150 is active, i.e., the reader 150 transmits interrogation radio signals, and receives radio signals from a passive electronic tag 182, which is powered by the interrogation signals.

In an example embodiment, the reader 150 is configured to read the electronic tag 182 using one or more of the following: near-field communication (NFC) technology 152, Bluetooth technology 154 (also Bluetooth Low Energy BLE), radio-frequency identification (RFID) technology 156. The NFC technology and the RFID technology enable the use of the passive electronic tags 182, whereas Bluetooth uses active electronic tags 182. The electronic tag 182 may be a contactless smart card (such as a proximity card), or a mobile phone with NFC tag functionality, for example.

The access control apparatus 100 also comprises a processor 102, coupled with the user interface 140, the internal communication interface 120, the external communication interface 160, and the reader 150.

The processor 102 is configured to cause the control apparatus 100 to perform the access control method for controlling the configuration of the automation apparatus 170.

The processor 102 may be implemented with one or more processors (such as microprocessors or microcontrollers) 102, and one or more memories 104 including computer program code 106. The one or more memories 104 and the computer program code 106 are configured to, with the one or more processors 102, cause performance of data processing operations of the access control apparatus 100.

The term 'processor' 102 refers to a device that is capable of processing data. Depending on the processing power needed, the access control apparatus 100 may comprise several processors 102 such as parallel processors, a multi-core processor, or a computing environment that simultaneously utilizes resources from several physical computer units (sometimes these are referred as cloud, fog or virtualized computing environments). When designing the implementation of the processor 102, a person skilled in the art will consider the requirements set for the size and power consumption of the control apparatus 100, the necessary processing capacity, production costs, and production volumes, for example.

A non-exhaustive list of implementation techniques for the processor 102 and the memory 104 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures. The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 106 may be implemented by software. In an example embodiment, the software may be written by a suitable programming language, and the resulting executable code may be stored in the memory 104 and run by the processor 102.

An example embodiment provides a computer-readable medium 118 storing computer program code 106, which, when loaded into the one or more processors 102 and executed by one or more processors 102, causes the one or more processors 102 to perform the computer-implemented access control method for controlling the configuration of the automation apparatus 170, which will be explained with reference to FIG. 2. The computer-readable medium 118 may comprise at least the following: any entity or device capable of carrying the computer program code 106 to the processor 102, a record medium, a computer memory, a read-only memory, an electrical carrier signal, a telecommunications signal, and a software distribution medium. In some jurisdictions, depending on the legislation and the patent practice, the computer-readable medium 118 may not be the telecommunications signal. In an example embodiment, the computer-readable medium 118 may be a computer-readable storage medium. In an example embodiment, the computer-readable medium 118 may be a non-transitory computer-readable storage medium.

The method starts in 200, and ends in 210.

In 202, authentication information 108 is read from the electronic tag 182.

In 204, the authentication information 108 is transmitted to a networked service 192.

In an example embodiment, the authentication information 108 read from the electronic tag 182 is encrypted and/or signed 212, and the encrypted and/or signed 212 authentication information 108 is transmitted to the networked service 192 for a verification. The authentication information 108 may be encrypted by a public key, wherein the networked service 192 has access to a secret decryption key. The authentication information 108 may be signed by a digital signature, wherein a signing algorithm has produced the signature by a private key, and a signature verifying algorithm in the networked service 192 checks with a public key that the authentication information 108 and the signature are authentic.

In 206, access rights 110 are received from the networked service 192.

In an example embodiment, the access rights 110 received from the networked service 192 are encrypted and/or signed 224. Technologies similar to encrypting and/or signing the authentication information 108 may be used for the access rights 110 as well.

In an example embodiment, the access rights 110 are received from the networked service 110 for a role 216 of a user.

In an example embodiment, the access rights 110 comprise a definition for a period 214 during which the configuration of the automation apparatus 170 according to the access rights 110 is allowable. The period 214 may be expressed in minutes, such as 15, 30 or 60 minutes, for example.

In 208, the configuration of the automation apparatus 170 is controlled according to the access rights 110. The control may enable one or more user configuration operations and/or disable one or more user configuration operations.

In an example embodiment, controlling 208 the configuration of the automation apparatus 170 according to the access rights 110 comprises one or more of the following: a software update 112 for the automation apparatus 170, a firmware update 114 for the automation apparatus 170, a manipulation (such as reading, and/or writing and/or updating) of one or more operation parameters 116 for the automation apparatus 170.

The configuration of the automation apparatus may be made in two different ways: solely by the local user 180 as illustrated in FIG. 3, or by a co-operation of the local user 180 and the remote user 196 as illustrated in FIG. 4.

Let us first study FIG. 3, which illustrates the local configuration by the local user 180.

The local user 180 selects 300 the local access from the user interface 140 of the access control apparatus 100. As a result of the selection 300, the user interface 140 requests 302 authentication from the local user 180.

The local user 180 uses the electronic tag 182 so that the authentication information 108 is read 202 from the electronic tag 182, and transmitted 204 to the networked service 192.

The networked service 192 may verify 304 the authentication information 108.

Then, the access control apparatus 100 receives 206 the access rights 110 from the networked service 192, opens 306 access for the local user 180 according to the access rights 110, and informs 308 the local user 180 of the access rights 110.

The local user 180 then performs 310 access, during which the configuration of the automation apparatus 170 is controlled 208 according to the access rights 110.

The local user 312 may close 312 the access.

As the access is closed 314, a change log is transmitted 316 from the access control apparatus 100 to the networked service 192, and the networked service 192 stores 318 the change log.

In the example embodiment of FIG. 3, the access rights 110 are received from the networked service 192 for a role 218 of the local user 180. The configuration of the automation apparatus 170 is controlled 208 according to the access rights 110 (including the role 218 of the local user 180) during the local access 310 by the local user 180. The local access 310 is performed using the user interface 140, and/or via the external communication interface 160, and/or via the reader 150. The local user 180 may thus manipulate the user interface 140 according to the role 218. The local user 180 may perform the configuration by manipulating the active electronic tag 182. The local user 180 may also possess a user apparatus 184, and perform the configuration by manipulating the user apparatus 184.

Next, let us study FIG. 4, which illustrates the co-operative remote configuration by the local user 180 and the remote user 196.

The local user 180 selects 400 the remote access from the user interface 140 of the access control apparatus 100. As a result of the selection 400, the user interface 140 requests 402 authentication from the local user 180.

The local user 180 uses the electronic tag 182 so that the authentication information 108 is read 202 from the electronic tag 182, and transmitted 204 to the networked service 192.

The networked service 192 may verify 404 the authentication information 108.

As shown in FIG. 1, the remote user 192 may manipulate a remote user apparatus 194 in order to perform the configuration. The networked server 192 requests 406 the remote user apparatus 194 to join the configuration session, and receives an acceptance 408 from the remote user apparatus 194.

Then, the access control apparatus 100 receives 206 the access rights 110 from the networked service 192, and informs 410 the local user 180 of the access rights 110.

The control 208 of the access rights comprises messaging 416 between the local user 180 (using the user interface 140 and/or the local user apparatus 184), an initiatilization 412 of the communication connection between the access control apparatus 100 and the remote user apparatus 194, and data exchange 414 between the access control apparatus 100 and the remote user apparatus 194.

The remote user apparatus 194 may close 418, 420 the remote access directly or via the networked service 192, or the local user 180 may terminate 226 the remote access.

The change log is transmitted 422 from the access control apparatus 100 to the networked service 192, and the networked service 192 stores 424 the change log.

In an example embodiment of FIG. 4, the access rights 110 are received from the networked service 192 for a role 220 of the remote user 196. The configuration of the automation apparatus 170 is controlled 208 according to the access rights 110 (including the role 220 of the remote user 196) during the remote access by the remote user 196. The remote access is performed via the external communication interface 160.

Naturally, in the example embodiment of FIG. 4, the access rights 110 may also be received from the networked service 192 for the role 218 of the local user 180, and the access control for the local user 180 may be performed as in the example embodiment of FIG. 3.

In an example embodiment related to FIG. 4, the access rights 110 received from the networked service 192 for the role 220 of the remote user 196 may comprise contact information 222. The communication session may be initiated via the external communication interface 160 for the remote access based on the contact information 222. The contact information 222 may comprise a network address (such an Internet Protocol IP address) to which the access control apparatus 100 opens a birectional communication connection.

In an example embodiment related to FIG. 4, the remote access may be terminated 226 as a result of a user interaction via the user interface 140 by the local user 180. In this way, the local user 140 may supervise the remote configuration, and if something erroneous or suspicious happens, the remote configuration may be aborted.

In example embodiment related to FIG. 4, changes made during the configuration of the automation apparatus 170 may be rejected 228 as a result of a user interaction via the user interface 140 by the local user 180. Alternatively, the changes may be accepted as a result of a user interaction via the user interface 140 by the local user 180. In this way, the local user may check that if the remote configuration did not succeed due to configuration errors, malicious behavior, transmission errors, etc., the result of the remote configuration is not taken into use, but the operation of the automation apparatus 170 is continued with the previous configuration.

The user apparatus 184, 194 may be a computer, laptop computer, tablet computer, phablet, mobile phone, smartphone, general-purpose mobile computing device, or some other electronic apparatus enabling user interaction by the local user 180 and the remote user 196. The user apparatus 184, 194 may be a general-purpose off-the-shelf computing device, as opposed to a purpose-build proprietary equipment, whereby research & development costs will be lower as only the special-purpose software (and not the hardware) needs to be designed, implemented and tested.

The networked service 192 may be implemented by one or more computer servers accessible via the network 190 (which may include a wired network such as the Internet and/or one or more wireless networks such as cellular radio networks). The networked service 192 may interoperate with access control apparatus 100 and the user apparatuses 184, 194 according to a client-server architecture, a cloud computing architecture, a peer-to-peer system, or another applicable distributed computing architecture.

Even though the invention has been described with reference to one or more example embodiments according to the accompanying drawings, it is clear that the invention is not restricted thereto but can be modified in several ways within the scope of the appended claims. All words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. An access control apparatus for controlling a configuration of an automation apparatus, comprising:
a user interface configured to interact with a local user;
an internal communication interface configured to communicate with the automation apparatus;
an external communication interface configured to communicate with a network;
a reader configured to read an electronic tag; and
a processor, coupled with the user interface, the internal communication interface, the external communication interface, and the reader, and configured to cause the control apparatus at least to perform;
reading authentication information from the electronic tag;
transmitting the authentication information to a networked service;
receiving access rights from the networked service;
controlling the configuration of the automation apparatus according to the access rights,
wherein the access rights are received from the networked service for a role of a remote user located remotely from the local user and the automation apparatus comprising contact information, and a communication session is initiated via the external communication interface for a remote access by the remote user based on the contact information, and the remote access is terminated as a result of a user interaction via the user interface by the local user; and
wherein changes made during the configuration of the automation apparatus can be rejected as a result of a user interaction via the user interface by the local user.

2. The access control apparatus of claim 1, wherein the access rights are received from the networked service for a role of a user.

3. The access control apparatus of claim 2, wherein the access rights comprise a definition for a period during which the configuration of the automation apparatus according to the access rights is allowable.

4. The access control apparatus of claim 3, wherein the access rights are received from the networked service for a role of the local user, the configuration of the automation apparatus is controlled according to the access rights during a local access by the local user, and the local access is performed using the user interface, and/or via the external communication interface, and/or via the reader.

5. The access control apparatus of claim 4, wherein the access rights are received from the networked service for the role of the remote user, the configuration of the automation apparatus is controlled according to the access rights during a remote access by the remote user, and the remote access is performed via the external communication interface.

6. The access control apparatus of claim 1, wherein the authentication read from the electronic tag is encrypted and/or signed, and the encrypted and/or signed authentication information is transmitted to the networked service for a verification.

7. The access control apparatus of claim 6, wherein the access rights received from the networked service are encrypted and/or signed.

8. The access control apparatus of claim 7, wherein controlling the configuration of the automation apparatus according to the access rights comprises one or more of the following: a software update for the automation apparatus, a firmware update for the automation apparatus, a manipulation of one or more operation parameters for the automation apparatus.

9. The access control apparatus of claim 1, wherein the reader is configured to read the electronic tag using one or more of the following: near-field communication technology (NFC), Bluetooth technology, radio-frequency identification (RFID) technology.

10. The access control apparatus of claim 1, wherein the internal communication interface is configured to communicate with the automation apparatus using one or more of the following: a bus interface, a software interface, a wired communication interface, a wireless communication interface, a short-range wireless transceiver.

11. The access control apparatus of claim 1, wherein the external communication interface is configured to communicate with the network using one or more of the following: a wireless local area network (WLAN), a low power wide area network (LPWAN), a narrowband Internet of things (NB-IoT), a cellular radio network, a wired network.

12. The access control apparatus of 1, wherein the access rights comprise a definition for a period during which the configuration of the automation apparatus according to the access rights is allowable.

13. The access control apparatus of claim 1, wherein the access rights are received from the networked service for a role of the local user, the configuration of the automation apparatus is controlled according to the access rights during a local access by the local user, and the local access is performed using the user interface, and/or via the external communication interface, and/or via the reader.

14. The access control apparatus of claim 1, wherein the access rights are received from the networked service for the role of the remote user, the configuration of the automation apparatus is controlled according to the access rights during a remote access by the remote user, and the remote access is performed via the external communication interface.

15. The access control apparatus of claim 1, wherein the authentication read from the electronic tag is encrypted and/or signed, and the encrypted and/or signed authentication information is transmitted to the networked service for a verification.

16. The access control apparatus of claim 1, wherein the access rights received from the networked service are encrypted and/or signed.

17. The access control apparatus of claim 1, wherein controlling the configuration of the automation apparatus according to the access rights comprises one or more of the following: a software update for the automation apparatus, a firmware update for the automation apparatus, a manipulation of one or more operation parameters for the automation apparatus.

18. An access control method for controlling a configuration of an automation apparatus, comprising:
reading authentication information from an electronic tag;
transmitting the authentication information to a networked service;
receiving access rights from the networked service; and
controlling the configuration of the automation apparatus according to the access rights;
wherein the access rights are received from the networked service for a role of a remote user located remotely from a local user and the automation apparatus comprising contact information, and a communication session is initiated via an external communication interface for a remote access by the remote user based on the contact information, and the remote access is terminated as a result of a user interaction via a user interface by the local user; and wherein changes made during the configuration of the automation apparatus can be rejected as a result of a local user interaction.

\* \* \* \* \*